Dec. 26, 1922.   1,440,349

A. FOLTZ.
JAR COVER AND GASKET.
FILED SEPT. 17, 1920.

WITNESSES

INVENTOR
ANDREW FOLTZ

BY

ATTORNEYS

UNITED STATES PATENT OFFICE.

ANDREW FOLTZ, OF LAMBERTVILLE, NEW JERSEY.

JAR COVER AND GASKET.

Application filed September 17, 1920. Serial No. 410,838.

*To all whom it may concern:*

Be it known that I, ANDREW FOLTZ, a citizen of the United States, and a resident of Lambertville, in the county of Hunterdon and State of New Jersey, have invented a new and Improved Jar Cover and Gasket, of which the following is a full, clear, and exact description.

This invention relates to closures for receptacles and refers particularly to an improvement in a jar cover and a gasket therefor.

The invention contemplates the provision of a jar and cover, formed respectively with co-acting gasket receiving seats which function to seal the cover to the jar, with the exertion of a minimum pressure.

The invention further contemplates the provision of a tubular gasket for use in connection with a jar and cover having a seat of the character described whereby to effectively seal the cover to the jaw and permit of the ready removal of the cover when desired.

A further object of the invention resides in the provision of a simple and effective cover and sealing means which is inexpensive to manufacture, highly efficient in its purpose and strong and durable in construction.

With the above objects in view, some of which will appear more clearly from the following detailed description, reference is had to the accompanying drawings forming a part of this application and in which.

Figure 1:
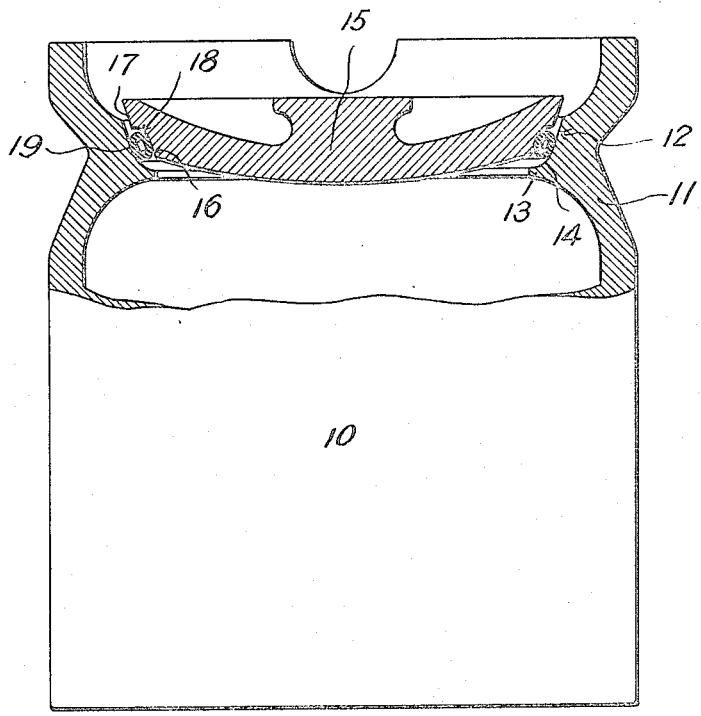
Figure 1 is a side elevation of a jar, partly in section and illustrating the same equipped with a cover and sealing gasket constructed in accordance with the invention.
Figure 2:
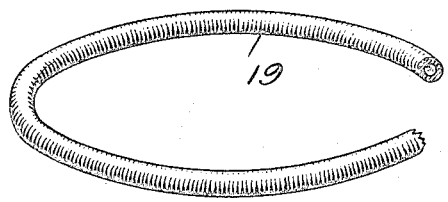
Figure 2 is a detail perspective view of the gasket removed with a part thereof broken away to illustrate the formation thereof.

Referring to the drawings by characters of reference, 10 designates a jar body provided with a reduced neck 11, having an upwardly and outwardly tapering conical mouth 12. The lower portion of the mouth 12 is provided with an inwardly projecting annular bead 13 provided at its juncture with the mouth, with a concave wall 14. The cover 15 is provided with a downwardly and inwardly tapered annular side wall 16, the upper portion thereof having an outwardly projecting annular bead 17 which is provided with a concave wall 18 at its juncture with the wall 16. An annular gasket 19 of tubular formation is preferably used in connection with the cover and is received and seated in the mouth 12. The gasket co-acts with the downwardly tapered wall 16 upon the application of the cover to the jaw and provides a seal between the mouth 12 and said wall 16. A minimum exertion of pressure will effect a slight distortion of the gasket and effect a sealing contact of the same with the entire surface of the mouth and the wall 16 of the cover. The concaved portions 14 and 18 constitute a means for limiting the relative movement of the wall 16 and the mouth 12 toward each other by providing gradually increasing diameters which grip the gasket. By using a gasket of tubular form as illustrated, the amount of pressure required for sealing the cover is minimized as a gasket of this form is more readily compressible than is a gasket of solid form and further a gasket of this form will adhere more closely to its seat and provide a more effective seal, as it will roll during the compressing action.

While there has been illustrated and described a single and preferred form, no limitation is necessarily made to the precise structural details and it is understood that the right is reserved to other embodiments which fall within the scope and meaning of the terms in which the claim is expressed.

Having thus described my invention, I claim as new and desire to secure by Letters Patent:

In combination, a jar and a cover therefor provided respectively with oppositely beveled complementary gasket receiving seats having enlarged beads and reversely curved portion at the juncture of said seats with the beads, and an annular tubular gasket adapted to be loosely received between said seats to coact therewith whereby upon application of the cover to the jar a rolling and distortion of the gasket will be effected to seal the closure.

ANDREW FOLTZ.